No. 739,536. PATENTED SEPT. 22, 1903.
J. T. FLAHERTY.
LIQUID MEASURE.
APPLICATION FILED MAR. 11, 1902.
NO MODEL.
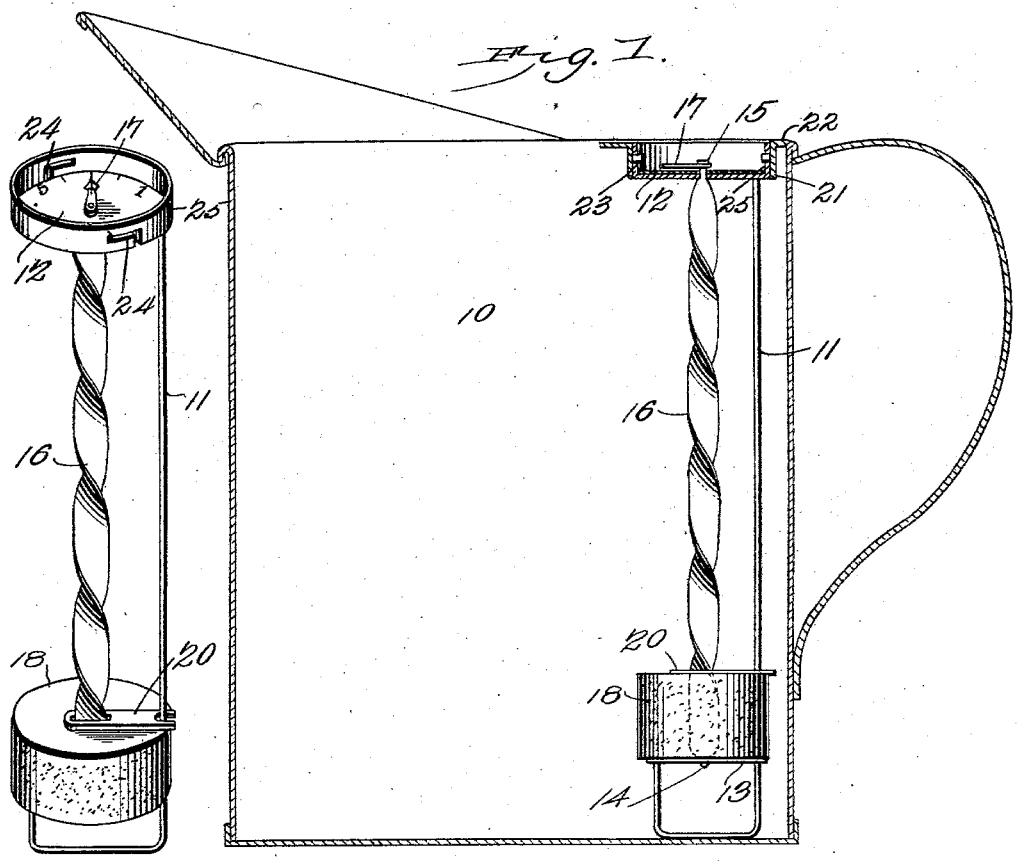
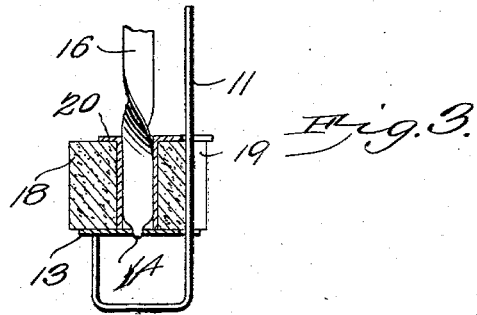
Witnesses
J. T. Flaherty, Inventor.
by C. A. Snow & Co
Attorneys No. 739,536.

Patented September 22, 1903.

UNITED STATES PATENT OFFICE.

JOHN T. FLAHERTY, OF WASHINGTON, DISTRICT OF COLUMBIA.

LIQUID-MEASURE.

SPECIFICATION forming part of Letters Patent No. 739,536, dated September 22, 1903.

Application filed March 11, 1902. Serial No. 97,775. (No model.)

*To all whom it may concern:*

Be it known that I, JOHN T. FLAHERTY, a citizen of the United States, residing at Washington, in the District of Columbia, have invented a new and useful Liquid-Measure, of which the following is a specification.

This invention relates to liquid-measures, and has for its object the production of a device adapted to be attached to a liquid-measure whereby the amount of liquid therein will be indicated.

The device may be attached to any form of measuring vessel. For the purpose of illustration I have shown it applied to an ordinary form of such a vessel.

Figure 1 represents a sectional side elevation with the improved attachment located therein. Fig. 2 is a perspective view of the attachment removed. Fig. 3 is a sectional detail of one form of the float.

The measuring vessel is represented at 10, with or without the usual graduated lines or ribs designating the pints, quarts, or other measures.

The attachment consists of a wire support 11, having a graduated dial 12 at one end with a step 13 at the other end, as shown. Supported revolubly by its lower end at 14 in the step 13 and by its upper end at 15 in the dial 12 is a twisted bar 16. Upon the upper end of this bar 16 is a pointer 17, adapted to move over the graduations on the dial when the bar is revolved. Engaging the bar 16 is a float 18, preferably of cork or other buoyant material and having a recess 19 on one side engaging the support 11, so that the float, while free to move upward and downward on the bar 16, will be held from turning by its engagement with the rod. A slotted and perforated wear-plate 20 will be attached to the float to receive the friction of the rod and twisted bar and prevent friction upon the softer material of the float. The float 18 is provided with a sleeve between it and the bar 16, adapted to receive the friction of the bar and preventing any wear upon the float itself. This is an important feature when the material of the float is cork or other fragile material. The step 13 is located some distance above the bottom of the vessel, so as to hold the float at a corresponding distance above the bottom when in its lowermost position, as the float is not required until the liquid rises to the lowermost graduation on the measure or when the smallest amount to be measured is placed in the vessel. The "twists" in the bar 16 will correspond to the graduations on the vessel, or to the pints, quarts, or other measures employed, and the notations on the dial 12 will likewise correspond therewith, so that as the liquid rises in the vessel and elevates the float 18 the latter, being held from turning by the rod 11, will cause the bar 16 to be revolved, which will likewise revolve the pointer 17 and indicate the location of the float, and consequently the amount of the contents of the vessel. By this simple means the amount of liquid in the vessel may be ascertained by observing the position of the pointer 17 on the dial 12.

The device as shown in Fig. 2 is complete in itself and may be inserted in any measuring vessel, and any suitable means may be employed for attaching it to the vessel. Some easily-detachable means will be preferable, and an approved form of such means is shown, consisting of an annular flange 21, depending from the guard-plate 22 and with one or more pins 23 projecting inward therefrom and adapted to engage recesses 24 in the sides of a corresponding annular sleeve 25, attached to and projecting upward from the dial 12. By this means a "bayonet-joint" coupling is provided between the attachment and the vessel, by which the device may be readily attached or detached when required.

It will be observed that by my invention the indicating-dial is disposed at the lower edge of the annular sleeve 25, which in operation is contained within and protected by the flange 21, depending from the guard-plate 22, said flanges being separately connected by means of the bayonet-joint. By this construction the indicator is protected and may at the same time be conveniently read, as will be readily understood.

The improved device constituting my invention is especially adapted to be used in connection with vessels for measuring beer and similar liquids, which, being forcibly discharged into the measuring vessel, will foam up, and thus make it difficult to ascertain the exact stage to which the measuring vessel has been filled. By my improvement, which is conveniently applicable to such vessels, the stage of the liquid contents of the latter may always be quickly ascertained. When the device is placed in position in a vessel, such as a beer-measure, as illustrated in Fig. 1, the lower end of the device is braced against the bottom of such vessel by the lower double end of the rod 11, which is made of suitable length to correspond with the depth of the vessel in connection with which it is to be employed. My improved measuring device thereby gains in stability, which is obviously important in a device of this class, which is naturally subjected to more or less knocking about.

The usual graduations upon measuring vessels will not be required when this device is employed.

The float employed may be of any approved form, and I do not, therefore, wish to be limited to any special form of float. The device may be modified in minor details without departing from the spirit or scope of the invention.

By the construction of the device, as herein described, with a supporting-frame, which is formed by a single wire rod supporting at its upper end the dial-plate and at its lower end the step, which in turn supports a float when the latter is at the lower limit of its movement, several important objects are attained. One is that the said wire rod offers the least possible frictional resistance to the float or to the guide connected with the latter in its upward or downward course. Another advantage is that the said frame when composed of a wire rod does not present any corners or recesses in which impurities might settle. Owing to this construction and also to the fact that the entire device is detachable, it may be readily cleansed whenever desired by simply rinsing it with water. Another and not inconsiderable advantage of the construction referred to is in the fact of its extreme cheapness of production. It should also be noticed that the indicating-dial is not supported by the wire rod 11 alone. It has an additional support at the upper end of the twisted bar 16, and it will thus be seen that the parts are constructed and assembled in such a manner as to provide a really efficient device, the strength and rigidity of which is amply sufficient for the purposes intended at a minimum expense.

Having thus described my invention, I claim—

In a liquid-measure, the combination of a measuring vessel having a depending supporting-sleeve in the upper part thereof, a dial having a flange detachably engaging said supporting-sleeve, means carried by said flange and sleeve whereby they may be detachably connected, a supporting-rod depending from the dial, bent at its lower end to rest upon the bottom of the measuring vessel and having an upwardly-extended end, a step forming a brace connecting the upper end of the upwardly-extended end with the body of the supporting-rod, a twisted bar supported revolubly in said step and in the dial and having a pointer movable upon the latter, and a float slidably disposed upon said bar and engaging the supporting-rod.

In testimony that I claim the foregoing as my own I have hereto affixed my signature in the presence of two witnesses.

JOHN T. FLAHERTY.

Witnesses:
J. H. JOCHUM, Jr.,
W. J. DILLON.